US010976402B2

(12) United States Patent
Virtej et al.

(10) Patent No.: US 10,976,402 B2
(45) Date of Patent: Apr. 13, 2021

(54) UNMANNED ARIAL VEHICLE RECOVERY MECHANISM

(71) Applicant: Nokia Technologies Oy, Espoo (FI)

(72) Inventors: Elena Virtej, Espoo (FI); Jeroen Wigard, Klarup (DK); Jari Hulkkonen, Oulu (FI); Mikko Säily, Laukkoski (FI); Istvan Kovacs, Aalborg (DK); Nitin Mangalvedhe, Hoffman Estates, IL (US)

(73) Assignee: Nokia Technologies Oy, Espoo (FI)

( * ) Notice: Subject to any disclaimer, the term of this patent is extended or adjusted under 35 U.S.C. 154(b) by 194 days.

(21) Appl. No.: 16/139,344

(22) Filed: Sep. 24, 2018

(65) Prior Publication Data

US 2020/0096594 A1 Mar. 26, 2020

(51) Int. Cl.
  *G01S 3/02* (2006.01)
  *G05D 1/00* (2006.01)
  *G08G 5/00* (2006.01)
  *B64C 39/02* (2006.01)
  *G01S 3/46* (2006.01)

(52) U.S. Cl.
  CPC ............ *G01S 3/023* (2013.01); *G05D 1/0022* (2013.01); *G08G 5/0069* (2013.01); *B64C 39/024* (2013.01); *B64C 2201/141* (2013.01); *G01S 3/46* (2013.01)

(58) Field of Classification Search
  CPC ... G01S 1/02; G01S 3/023; G01S 3/74; G01S 3/46; G01S 3/043; G01S 3/14; G05D 1/0022; G08G 5/0069

USPC ......................................................... 342/417
See application file for complete search history.

(56) References Cited

U.S. PATENT DOCUMENTS

| 2010/0198514 A1* | 8/2010 | Miralles .................. F41G 9/002 701/302 |
| 2016/0105233 A1* | 4/2016 | Jalali ........................ H01Q 3/08 342/359 |

(Continued)

OTHER PUBLICATIONS

Wu, S. et al.; "Improving the Coverage and Spectral Efficiency of Millimeter-Wave Cellular Networks Using Device-to-Device Relays"; Jan. 2018; arXiv:1611.06164v2; whole document (32 pages).

(Continued)

*Primary Examiner* — Harry K Liu
(74) *Attorney, Agent, or Firm* — Harrington & Smith (57) ABSTRACT

In accordance with example embodiments of the invention there is at least a method and apparatus to perform at least detecting, by an unmanned vehicle of a communication network, a radio connection quality degradation at the unmanned vehicle; and in response to the detecting, autonomously directing the unmanned vehicle on a rescue movement path to new geographical coordinates provided by the communication network to maintain or reestablish the radio connection. Further, to perform determining that a radio connection quality degradation is to occur or has occurred at an unmanned vehicle of a communication network; and based on the determining, providing a rescue movement path to new geographical coordinates to the unmanned vehicle for a radio connection quality degradation to maintain or reestablish the radio connection.

21 Claims, 5 Drawing Sheets

(56) References Cited

U.S. PATENT DOCUMENTS

| | | | |
|---|---|---|---|
| 2016/0380692 A1* | 12/2016 | Jalali | H04W 16/28 |
| | | | 455/11.1 |
| 2017/0012697 A1* | 1/2017 | Gong | B64C 39/024 |
| 2018/0217593 A1* | 8/2018 | Erickson | G08G 5/0013 |
| 2018/0268719 A1* | 9/2018 | Guan | G08G 5/0056 |
| 2019/0003807 A1* | 1/2019 | Whitmarsh | G08G 5/0069 |
| 2019/0098433 A1* | 3/2019 | Shaw | G05D 1/0022 |
| 2020/0074866 A1* | 3/2020 | Delaney | G08G 5/0069 |
| 2020/0105151 A1* | 4/2020 | Mahkonen | H04W 4/06 |

OTHER PUBLICATIONS

Mozaffari, M. et al.; "Unmanned Aerial Vehicle With Underlaid Device-to-Device Communications: Performance and Tradeoffs"; Jun. 2016; IEEE Transactions on Wireless Communications, vol. 15, No. 6; whole document (15 pages).

* cited by examiner

510: detecting, by an unmanned vehicle of a communication network, a radio connection quality degradation at the unmanned vehicle 520: in response to the detecting, autonomously directing the unmanned vehicle on a rescue movement path to new geographical coordinates provided by the communication network to maintain or reestablish the radio connection

FIG. 5A

550: determining that a radio connection quality degradation is to occur or has occurred at an unmanned vehicle of a communication network 560: based on the determining, providing a rescue movement path to new geographical coordinates to the unmanned vehicle for a radio connection quality degradation to maintain or reestablish the radio connection

FIG. 5B

UNMANNED ARIAL VEHICLE RECOVERY MECHANISM

TECHNICAL FIELD

The teachings in accordance with the exemplary embodiments of this invention relate generally to unmanned vehicle recovery operations and, more specifically, relate to recovery operations of unmanned vehicle which have lost radio connection.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:
UAV Unmanned Aerial Vehicle
UAS Unmanned Aerial Systems
NW Network
URLLC Ultra Reliable Low Latency Communications
D2D Device-to-Device
LTE Long Term Evolution
HO Handover
UTM Unmanned Traffic Management
V2N Vehicle-to-Network
HST High Speed Trains
ID Identifier Unmanned systems sometimes referred-to in the art as "drones" have become more technologically advanced and provide advantages such that their use is being called on by businesses and individuals alike for many different purposes. These unmanned systems do not generally carry a human operator and can be remotely controlled using radio signals over radio connections.

An issue can occur at least in a case where the radio signals cannot be communicated with the unmanned system. With radio signals and radio connections being vulnerable to interruption it can be seen that this can lead to disastrous effects to an unmanned system and even other devices or persons surrounding it.

Example embodiments of the invention work to at least address these issues and solve such radio signal and radio connection failures at unmanned systems.

SUMMARY

In an example aspect of the invention, there is a method comprising: detecting, by an unmanned vehicle of a communication network, a radio connection quality degradation at the unmanned vehicle; in response to the detecting, autonomously directing the unmanned vehicle on a rescue movement path to new geographical coordinates provided by the communication network to maintain or reestablish the radio connection.

A further example aspect is a method comprising the method of the previous paragraph, where in there is broadcasting a connection request beacon towards at least one other unmanned vehicle in a radio coverage area of the other unmanned vehicle for forwarding by the at least one other unmanned vehicle towards the communication network; and based on the broadcasting, receiving via the at least one other unmanned vehicle the rescue movement path to new geographical coordinates as provided by the communication network to maintain or reestablish the radio connection; wherein the connection request beacon is broadcast towards the at least one other unmanned vehicle using at least one of a cellular device-to-device side-link radio resource allocation, and other radio technologies, wherein the other radio technologies comprise at least one of Bluetooth, Zigbee, and proprietary radio technologies; wherein the rescue movement path is provided to the unmanned vehicle via the at least one other unmanned vehicle using one of a multicast message, or a radio resource connection message provided by the communication network to each of the at least one other unmanned vehicle; wherein the rescue movement path to new geographical coordinates is received from the communication network via a particular other unmanned vehicle selected by the communication network from the at least one other unmanned vehicle; wherein the particular unmanned vehicle is part of a radio relay link preconfigured by the communication network for providing connection setup information to an unmanned vehicle of the communication network; wherein the rescue movement path is based on data from the at least one other unmanned vehicle of the communication network combined with network planning data; wherein the rescue movement path to new geographical coordinates was provided by the communication network to the unmanned vehicle for radio connection quality degradation prior to the radio connection quality degradation; wherein the rescue movement path to new geographical coordinates is provided by the communication network prior to the radio link failure based on at least one of a signal level, quality measurements, a speed, an altitude, and a movement direction of the unmanned vehicle as determined by the communication network; wherein there is, in response to the detecting, sending a warning signal towards the at least one other unmanned vehicle; and in response to the warning signal, establishing a connection with a selected one of the at least one other unmanned vehicle that responded to the warning signal for communication with the communication network; wherein there is, in response to the detecting, starting a timer at the unmanned vehicle; and based on the radio connection quality degradation remaining at an expiration of the timer, execute a fallback operation at the unmanned vehicle until contact with another unmanned vehicle is achieved.

In an example aspect of the invention, there is an apparatus, such as a user equipment side apparatus, comprising: at least one processor; and at least one memory including computer program code, where the at least one memory and the computer program code are configured, with the at least one processor, to cause the apparatus to at least: detect, by an unmanned vehicle of a communication network, a radio connection quality degradation at the unmanned vehicle; in response to the detecting, autonomously direct the unmanned vehicle on a rescue movement path to new geographical coordinates provided by the communication network to maintain or reestablish the radio connection.

A further example aspect is an apparatus comprising the apparatus of the previous paragraph, wherein the at least one memory including the computer program code is configured with the at least one processor to cause the apparatus to: broadcast a connection request beacon towards at least one other unmanned vehicle in a radio coverage area of the unmanned vehicle for forwarding by the at least one other unmanned vehicle towards the communication network; and based on the broadcasting, receiving via the at least one other unmanned vehicle the rescue movement path to new geographical coordinates as provided by the communication network to maintain or reestablish the radio connection; wherein the connection request beacon is broadcast towards the at least one other unmanned vehicle using at least one of a cellular device-to-device side-link radio resource allocation, and other radio technologies, wherein the other radio technologies comprise at least one of Bluetooth, Zigbee, and proprietary radio technologies; wherein the rescue movement path is provided to the unmanned vehicle via the at least one other unmanned vehicle using one of a multicast message, or a radio resource connection message provided by the communication network to each of the at least one other unmanned vehicle; wherein the rescue movement path to new geographical coordinates is received from the communication network via a particular other unmanned vehicle selected by the communication network from the at least one other unmanned vehicle; wherein the particular unmanned vehicle is part of a radio relay link preconfigured by the communication network for providing connection setup information to an unmanned vehicle of the communication network; wherein the rescue movement path is based on data from the at least one other unmanned vehicle of the communication network combined with network planning data; wherein the rescue movement path to new geographical coordinates was provided by the communication network to the unmanned vehicle for radio connection quality degradation prior to the radio connection quality degradation; wherein the rescue movement path to new geographical coordinates is provided by the communication network prior to the radio link failure based on at least one of a signal level, quality measurements, a speed, an altitude, and a movement direction of the unmanned vehicle as determined by the communication network; wherein the at least one memory including the computer program code is configured with the at least one processor to cause the apparatus to, in response to the detecting, send a warning signal towards the at least one other unmanned vehicle; and in response to the warning signal, establishing a connection with a selected one of the at least one other unmanned vehicle that responded to the warning signal for communication with the communication network; wherein the at least one memory including the computer program code is configured with the at least one processor to cause the apparatus to, in response to the detecting, start a timer at the unmanned vehicle; and based on the radio connection quality degradation remaining at an expiration of the timer, execute a fallback operation at the unmanned vehicle until contact with another unmanned vehicle is achieved.

In another example aspect of the invention, there is an apparatus, such as a user side apparatus, comprising: means for detecting, by an unmanned vehicle of a communication network, a radio connection quality degradation at the unmanned vehicle; in response to the detecting, means for autonomously directing the unmanned vehicle on a rescue movement path to new geographical coordinates provided by the communication network to maintain or reestablish the radio connection.

A further example aspect is an apparatus comprising the apparatus of the previous paragraph, wherein there is means for broadcasting a connection request beacon towards at least one other unmanned vehicle in a radio coverage area of the unmanned vehicle for forwarding by the at least one other unmanned vehicle towards the communication network; and based on the broadcasting, receiving via the at least one other unmanned vehicle the rescue movement path to new geographical coordinates as provided by the communication network to maintain or reestablish the radio connection; wherein the connection request beacon is broadcast towards the at least one other unmanned vehicle using at least one of a cellular device-to-device side-link radio resource allocation, and other radio technologies, wherein the other radio technologies comprise at least one of Bluetooth, Zigbee, and proprietary radio technologies; wherein the rescue movement path is provided to the unmanned vehicle via the at least one other unmanned vehicle using one of a multicast message, or a radio resource connection message provided by the communication network to each of the at least one other unmanned vehicle; wherein the rescue movement path to new geographical coordinates is received from the communication network via a particular other unmanned vehicle selected by the communication network from the at least one other unmanned vehicle; wherein the particular unmanned vehicle is part of a radio relay link preconfigured by the communication network for providing connection setup information to an unmanned vehicle of the communication network; wherein the rescue movement path is based on data from the at least one other unmanned vehicle of the communication network combined with network planning data; wherein the rescue movement path to new geographical coordinates was provided by the communication network to the unmanned vehicle for radio connection quality degradation prior to the radio connection quality degradation; wherein the rescue movement path to new geographical coordinates is provided by the communication network prior to the radio link failure based on at least one of a signal level, quality measurements, a speed, an altitude, and a movement direction of the unmanned vehicle as determined by the communication network; wherein there is means, in response to the detecting, for sending a warning signal towards the at least one other unmanned vehicle; and in response to the warning signal, establishing a connection with a selected one of the at least one other unmanned vehicle that responded to the warning signal for communication with the communication network; wherein there is means, in response to the detecting, for starting a timer at the unmanned vehicle; and based on the radio connection quality degradation remaining at an expiration of the timer, execute a fallback operation at the unmanned vehicle until contact with another unmanned vehicle is achieved.

In an example aspect of the invention, there is a method comprising: determining that a radio connection quality degradation is to occur or has occurred at an unmanned vehicle of a communication network; and based on the determining, providing a rescue movement path to new geographical coordinates to the unmanned vehicle for a radio connection quality degradation to maintain or reestablish the radio connection.

A further example aspect is a method comprising the method of the previous paragraph, wherein the determining comprises determining that a radio connection quality degradation has occurred at the unmanned vehicle based on receiving a connection request beacon forwarded by at least one other unmanned vehicle from the unmanned vehicle towards the communication network; wherein the recue movement path to new geographical coordinates is provided to the unmanned vehicle via at least one other unmanned vehicle in a radio coverage area of the unmanned vehicle using one of a multicast message, or a radio resource connection message provided by the communication network to each of the at least one unmanned vehicle; wherein the rescue movement path to new geographical coordinates is provided by the communication network to the unmanned vehicle via a particular unmanned vehicle selected by the communication network from the at least one unmanned vehicle; wherein the particular unmanned vehicle is part of a radio relay link preconfigured by the communication network for providing connection setup information to the unmanned vehicle; wherein the rescue movement path is based on data from the at least one unmanned vehicle of the communication network combined with network planning data; wherein the rescue movement path to new geographical coordinates was provided by the communication network to the unmanned vehicle for radio connection quality degradation prior to the radio connection quality degradation; wherein the rescue movement path to new geographical coordinates is provided by the communication network prior to the radio link failure based on at least one of a signal level, quality measurements, a speed, an altitude, and a direction of the unmanned vehicle as determined by the communication network; wherein the rescue movement path to new geographical coordinates is provided by the communication network via a direct page to the unmanned vehicle; wherein there is, in response to detecting the radio connection quality degradation, starting a timer; and based on the radio connection quality degradation remaining at an expiration of the timer, sending towards at least one other unmanned vehicle of the communication network information comprising an indication of the radio connection quality degradation at the unmanned vehicle; wherein the information comprises rerouting information for the at least one unmanned vehicle.

In an example aspect of the invention, there is an apparatus, such as a network side apparatus, comprising: at least one processor; and at least one memory including computer program code, where the at least one memory and the computer program code are configured, with the at least one processor, to cause the apparatus to at least: determine that a radio connection quality degradation is to occur or has occurred at an unmanned vehicle of a communication network; and based on the determining, provide a rescue movement path to new geographical coordinates to the unmanned vehicle for a radio connection quality degradation to maintain or reestablish the radio connection.

A further example aspect is an apparatus comprising the apparatus of the previous paragraph, wherein the determining comprises determining that a radio connection quality degradation has occurred at the unmanned vehicle based on receiving a connection request beacon forwarded by at least one other unmanned vehicle from the unmanned vehicle towards the communication network; wherein the rescue movement path to new geographical coordinates is provided to the unmanned vehicle via at least one other unmanned vehicle in a radio coverage area of the unmanned vehicle using one of a multicast message, or a radio resource connection message provided by the communication network to each of the at least one unmanned vehicle; wherein the rescue movement path to new geographical coordinates is provided by the communication network to the unmanned vehicle via a particular unmanned vehicle selected by the communication network from the at least one unmanned vehicle; wherein the particular unmanned vehicle is part of a radio relay link preconfigured by the communication network for providing connection setup information to the unmanned vehicle; wherein the rescue movement path is based on data from the at least one unmanned vehicle of the communication network combined with network planning data; wherein the rescue movement path to new geographical coordinates was provided by the communication network to the unmanned vehicle for radio connection quality degradation prior to the radio connection quality degradation; wherein the rescue movement path to new geographical coordinates is provided by the communication network prior to the radio link failure based on at least one of a signal level, quality measurements, a speed, an altitude, and a direction of the unmanned vehicle as determined by the communication network; wherein the rescue movement path to new geographical coordinates is provided by the communication network via a direct page to the unmanned vehicle; wherein the at least one memory including the computer program code is configured with the at least one processor to cause the apparatus to: in response to detecting the radio connection quality degradation, start a timer; and based on the radio connection quality degradation remaining at an expiration of the timer, send towards at least one other unmanned vehicle of the communication network information comprising an indication of the radio connection quality degradation at the unmanned vehicle; and wherein the information comprises rerouting information for the at least one unmanned vehicle.

In an example aspect of the invention, there is an apparatus, such as a network side apparatus, comprising: means for determining that a radio connection quality degradation is to occur or has occurred at an unmanned vehicle of a communication network; and means, based on the determining, for providing a rescue movement path to new geographical coordinates to the unmanned vehicle for a radio connection quality degradation to maintain or reestablish the radio connection.

A further example aspect is an apparatus comprising the apparatus of the previous paragraph, wherein the determining comprises determining that a radio connection quality degradation has occurred at the unmanned vehicle based on receiving a connection request beacon forwarded by at least one other unmanned vehicle from the unmanned vehicle towards the communication network; wherein the recue movement path to new geographical coordinates is provided to the unmanned vehicle via at least one other unmanned vehicle in a radio coverage area of the unmanned vehicle using one of a multicast message, or a radio resource connection message provided by the communication network to each of the at least one unmanned vehicle; wherein the rescue movement path to new geographical coordinates is provided by the communication network to the unmanned vehicle via a particular unmanned vehicle selected by the communication network from the at least one unmanned vehicle; wherein the particular unmanned vehicle is part of a radio relay link preconfigured by the communication network for providing connection setup information to the unmanned vehicle; wherein the rescue movement path is based on data from the at least one unmanned vehicle of the communication network combined with network planning data; wherein the rescue movement path to new geographical coordinates was provided by the communication network to the unmanned vehicle for radio connection quality degradation prior to the radio connection quality degradation; wherein the rescue movement path to new geographical coordinates is provided by the communication network prior to the radio link failure based on at least one of a signal level, quality measurements, a speed, an altitude, and a direction of the unmanned vehicle as determined by the communication network; wherein the rescue movement path to new geographical coordinates is provided by the communication network via a direct page to the unmanned vehicle; wherein there is means, in response to detecting the radio connection quality degradation, for starting a timer; and based on the radio connection quality degradation remaining at an expiration of the timer, sending towards at least one other unmanned vehicle of the communication network information comprising an indication of the radio connection quality degradation at the unmanned vehicle; wherein the information comprises rerouting information for the at least one unmanned vehicle.

BRIEF DESCRIPTION OF THE DRAWINGS

The foregoing and other aspects of embodiments of this invention are made more evident in the following Detailed Description, when read in conjunction with the attached Drawing Figures (FIG.s), wherein.

DETAILED DESCRIPTION

In this invention, we propose a sequence design to enable recovery operations of unmanned vehicle which have lost communications with its operator.

Unmanned aerial vehicles (UAVs), also known as drones, are getting increasingly popular and receive significant attention from the industry regarding their promising potential to reduce risk and cost for many commercial activities. Currently regulations are such that UAVs are only allowed to be flying in visual line of sight (VLOS), but this is expected to be changed in the near future, enabling beyond visual line of sight (BVLOS) flights. One of the new requirements enabling this will be that there needs to be control to the UAV through a control link (also referred to as C2 link) which can be connected to a UAV Traffic Management (UTM) system or similar.

The C2 link can be provided through existing cellular networks, as they are able to provide good coverage up to at least 125 meters, which is the height UAVs are today allowed to fly in most countries, as shown by measurements for instance. Beside the C2 link, applications on the UAV may also require connectivity for a secondary or auxiliary cellular radio device on board (not related to UTM traffic control), like for instance for uplink video streaming from the camera from the UAV or for personal devices of a passenger with regard to drones carrying humans. On the other hand, an additional radio link suitable for the usage of traffic control in the case the UTM system faces issues, especially with humans on board, may be advantageous for instance.

Beside the C2 link, applications on the UAV may also require connectivity for a secondary or auxiliary cellular radio device on board (not related to UTM traffic control), like for instance for uplink video streaming from the camera from the UAV or for personal devices of a passenger with regard to drones carrying humans. On the other hand, an additional radio link suitable for the usage of traffic control in the case the UTM system faces issues, especially with humans on board, may be advantageous.

For a cellular network connectivity in the air is having some different characteristics than connectivity at ground level: first of all, a UE in the air has a much higher probability of being in Line Of Sight (LOS) condition with the serving cell, but also with the interfering cells: this means the desired signal is received rather well, but the potential interference is also increased. Secondly a UE in the air will see more cells, so there are potentially more handover candidates. This can lead to frequent handovers if the same settings are being used as for ground based UEs. This is especially true in the vertical domain, where our measurements show an increase in the number of handovers.

The C2 link is to be provided with high reliability (see for instance 3GPP 36.777, where the reliability requirement is set to be 99.9% with 50 ms.) and this is especially important during take-off and landing which are the most critical flight operations. This obviously means that recovery mechanisms should be in place when connectivity failures happen. This invention report focuses on this aspect This invention relates to UAV (Unmanned Aerials Vehicles) SP-180172 WI in 3GPP.

A problem is foreseen in case of radio link failure as to what recovery mechanisms should be efficiently applied. For example, what the UAV could do for a flight plan when UAV loses NW connection, and cannot send anymore its location to the NW. The problem of a lost radio connection can be further classified into scenarios, where I.) there is coverage but connection is lost, II.) there is partial coverage through D2D Sidelink e.g. at least one UAV has RRC connection which is used to support other UAVs, iii) there is no coverage nor RRC connection and only option is D2D connectivity between UAVs in RRC_IDLE state.

In art present at the time of this application a concept of UAV (Unmanned Aerial Vehicles) Traffic Management (UTM) systems/entities can be seen as well known for example:

There is some overview and control of drone traffic and cellular networks that can be used for the communication to and from drones. In case of an RLF they have no mechanisms to get into contact with the drone;

Drone flight service control and provider may with link to the UTM such that the link may be utilized over cellular networks, so will be without connectivity if an RLF happens;

UAVs can be advanced such that they can have sense and avoid mechanisms, and utilize on-board sensors, cameras, lidar, radar, etc. allowing the UAVs to avoid other drones and/or objects in the air about them;

UAVs may use proprietary radio technology as main/backup-up control link, along with the 3GPP LTE/5G radio. This gives protection against an RLF on the cellular network, but the proprietary radio typically has coverage limitations, which means no BVLOS flights are possible; and UAVs or drones can have different options if they lose the radio connection (or other on-board system failures) such as they can return or fly back to a start location or a preprogrammed location, or land where it is.

Example embodiments of the invention as discussed herein enable a reduced risk of UAV losing network connection, and an ability to handle the connection loss intelligently.

Figure 1:
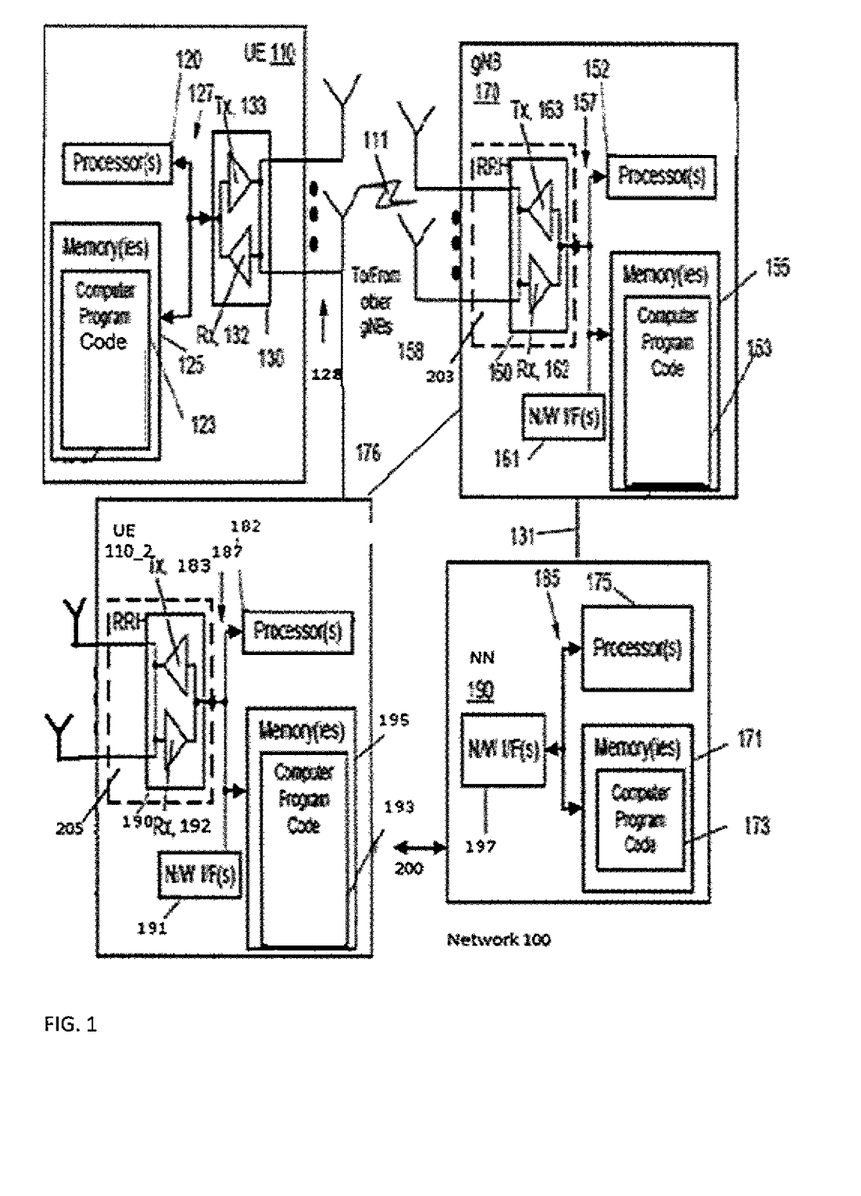
FIG. 1 shows a high level block diagram of various devices used in carrying out various aspects of the invention.

Before describing the example embodiments of the invention in further detail, reference is made to FIG. 1 for illustrating a simplified block diagram of various electronic devices that are suitable for use in practicing the example embodiments of this invention. FIG. 1 shows a block diagram of one possible and non-limiting exemplary system in which the example embodiments of the invention may be practiced. In FIG. 1, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver Rx, 132 and a transmitter Tx 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more transceivers 130 have multi-connectivity configurations and communicate over the wireless network 100 or any other network. The one or more memories 125 include computer program code 123 executed by the one or more processors 120. The one or more processors 120 may be implemented also as an integrated circuit or through other hardware such as a programmable gate array. For instance, the one or more memories 125 and the computer program code 123 may be configured, with the one or more processors 120, to cause the UE 110 to perform one or more of the operations as described herein. The UE 110 communicates with gNB 170 and the UE 110_2 via a wireless link 111.

The gNB 170 (NR/5G Node B or possibly an evolved NB) is a base station such as a secondary node base station (e.g., for NR or LTE long term evolution) that communicates with devices such as UE 110 and UE 110_2 of FIG. 1. The gNB 170 provides access to wireless devices such as the UE 110 to the wireless network 100. The gNB 170 includes one or more processors 152, one or more memories 155, one or more network interfaces (N/W I/F(s)) 161, and one or more transceivers 160 interconnected through one or more buses 157. Each of the one or more transceivers 160 includes a receiver Rx 162 and a transmitter Tx 163. The one or more transceivers 160 are connected to one or more antennas 158. The one or more memories 155 include computer program code 153 executed by the one or more processors 152. The one or more processors 152 may be implemented also as an integrated circuit or through other hardware such as a programmable gate array. The one or more memories 155 and the computer program code 153 are configured to cause, with the one or more processors 152, the gNB 170 to perform one or more of the operations as described herein. The one or more network interfaces 161 and 191 and the one or more transceivers 160 that have multi-connectivity configurations and communicate over the wireless network 100 or any other network. Such communication can be between the gNB 170, the UE 110_2, and the UE 110 via the links 176 and 111. In addition, two or more gNB 170 may communicate with another gNB or eNB using, e.g., links 176. The links 176 may be wired or wireless or both and may implement, e.g., an X2 interface. Further the links 176 may be through other network devices such as, but not limited to a device such as the NN 190 of FIG. 1.

The UE 110_2 is a network node such as another UAV that communicates with devices such as the gNB 170 and/or UE 110 and/or the wireless network 100. The UE 110_2 includes one or more processors 182, one or more memories 195, one or more network interfaces (N/W I/F(s)) 191, and one or more transceivers 190 interconnected through one or more buses 187. Each of the one or more transceivers 190 includes a receiver Rx 192 and a transmitter Tx 183. The one or more transceivers 190 are connected to one or more antennas 185. The one or more transceivers 190 have multi-connectivity configurations and communicate over the wireless network 100 or any other network. The one or more memories 195 include computer program code 193 executed by the one or more processors 182. The one or more processors 182 may be implemented also as an integrated circuit or through other hardware such as a programmable gate array. The one or more memories 155 and the computer program code 153 are configured to cause, with the one or more processors 182, the UE 110_2 to perform one or more of the operations as described herein. The one or more network interfaces 181 communicate over a network such as via the links 176. Two or more UE such as the UE 110_2 and UE 110 may communicate with each other or a gNB and/or eNB or any other device using one or more antenna and one or more radio links, e.g., links 176 and/or RRH communications.

The one or more buses 157 and 187 may be address, data, or control buses, and may include any interconnection mechanism, such as a series of lines on a motherboard or integrated circuit, fiber optics or other optical communication equipment, wireless channels, and the like. For example, the one or more transceivers 160 and/or 190 may be implemented as a remote radio head (RRH) 203 and/or 205, with the other elements of the gNB 170 being physically in a different location from the RRH, and the one or more buses 157 could be implemented in part as fiber optic cable to connect the other elements of the gNB 170 to a RRH.

It is noted that description herein indicates that "cells" perform functions, but it should be clear that the gNB that forms the cell will perform the functions. The cell makes up part of a gNB. That is, there can be multiple cells per gNB.

The wireless network 100 may include a NN 190 that may include a network control entity such as with an MME (Mobility Management Entity)/SGW (Serving Gateway) functionality, and which provides connectivity with a further network, such as a telephone network and/or a data communications network (e.g., the Internet). The gNB 170 is coupled via a link 131 to the NN 190. The UE 110_2 is coupled via a link 200 to the NN 190. Further, the UE 110_2 is coupled via links 176 to the gNB 170. The links 131, 176, and/or 200 may be implemented as, e.g., an S1 interface.

The NN 190 includes one or more processors 175, one or more memories 171, and one or more network interfaces (N/W I/F(s)) 197), interconnected through one or more buses coupled with the link 185. The one or more memories 171 include computer program code 173. The one or more memories 171 and the computer program code 173 are configured to, with the one or more processors 175, cause the NN 190 to perform one or more operations which may be needed to support the operations in accordance with the example embodiments of the invention.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152, 182, or 175 and memories 155, 195, and 171, and also such virtualized entities create technical effects.

The computer readable memories 125, 155, 171, and 195 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, 171, and 195 may be means for performing storage functions. The processors 125, 155, 171, and 195 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, 175, and 182 may be means for performing functions, such as controlling the UE 110, gNB 170, UE 110_2, and other functions as described herein.

In accordance with example embodiments of the invention a RAN may periodically provide RC ('rescue coordinates') to all UAVs along their respective flight paths served via broadcast/multicast or dedicated signaling. These coordinates are to be used autonomously by the UAVs when radio connection failure is detected. The RC are determined by the RAN based on previously obtained radio coverage information and in agreement with (approved by) UTM flight plan.

In accordance with example embodiments, if the connection is lost (which may happen even after all the precautions), a recovery can be attempted.

In accordance with example embodiments, the UAV can be configured to attempt to send out beacons requesting assistance from other UAVs in the area. Those could then relay messages to/from the "lost" UAV to assist it finds its way to back to network coverage and/or its destination.

Alternatively, (or if no response to the beacons), in accordance with example embodiments, the UAV may be configured to return to the last received RC, where better connectivity is expected based on previously received signaling after which the UAV may be provided an updated flight plan.

This solution is relevant especially in a high dynamic environment where the network connection is vital due to the frequent changes in the environment (optimal routes, other UAVs etc.), or in a setting where the network coverage is limited (for instance in some cases mainly to the proximity of a railway tracks, roads etc.).

Figure 2:
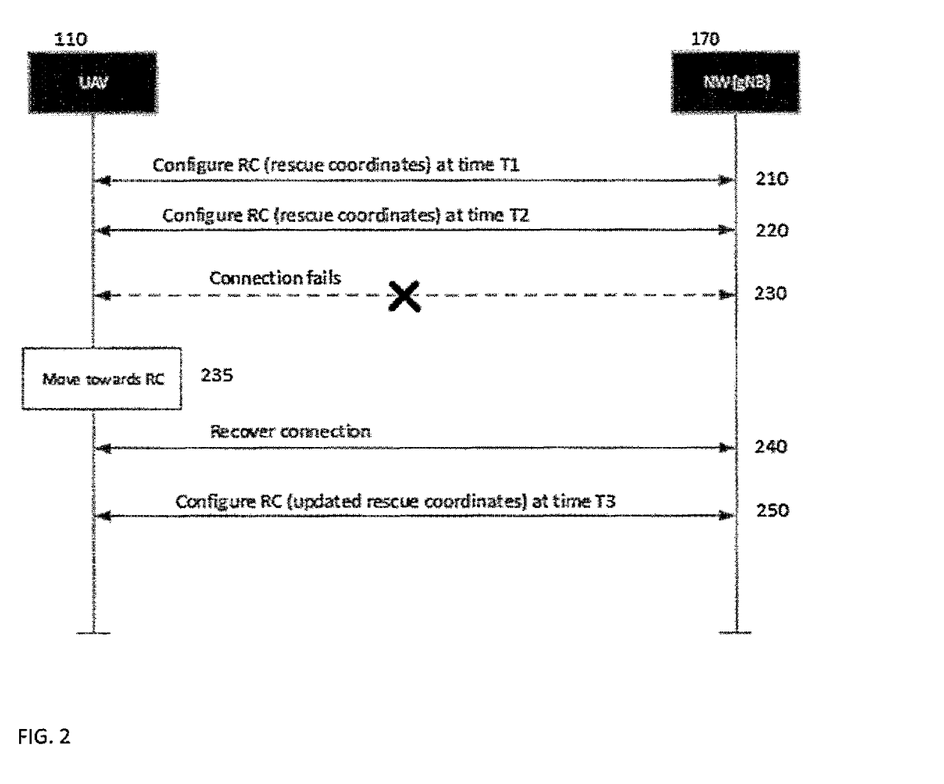
FIG. 2 shows a flow diagram of example operations in accordance with an example embodiment of the invention including proactive signalling of information such as rescue coordinates indicating direction for addressing a radio coverage failure.

FIG. 2 shows a flow diagram of operations in accordance with example embodiments of the invention which can be used with proactive signalling of RC (rescue coordinates) indicating direction towards better radio coverage. RC are updated according to latest information (e.g. radio coverage, obstacles, UE's location and planned route). An example of RAN periodically providing RC ('rescue coordinates') to all UAVs served via broadcast/multicast or dedicated signaling is shown in FIG. 2. As shown in FIG. 2 the NW (gNB) 170 (such as the gNB 170 as in FIG. 1) sends towards the UAV 110 (such as a UE 110 of FIG. 1) a Configure RC at a time T1 210 with a configuration of rescue coordinates (RC). Further, as shown in FIG. 2 the NW (gNB) 170 sends towards the UAV 110 (e.g., UE 110 of FIG. 1) a Configure RC at a time T2 220 with a configuration of rescue coordinates. As shown in FIG. 2 the connection fails 230. At step 235 of FIG. 2 the UAV 110 then moves towards RC 235. At step 240 of FIG. 2 there is a Recover connection operation.

Then finally at step 250 of FIG. 2 NW (gNB) 170 and the UAV 110 communicate another Configure RC (rescue coordinates) at a time T3 250. As shown in FIG. 2 there is continuous updating of rescue coordinates at the UAV 110.

Figure 3:
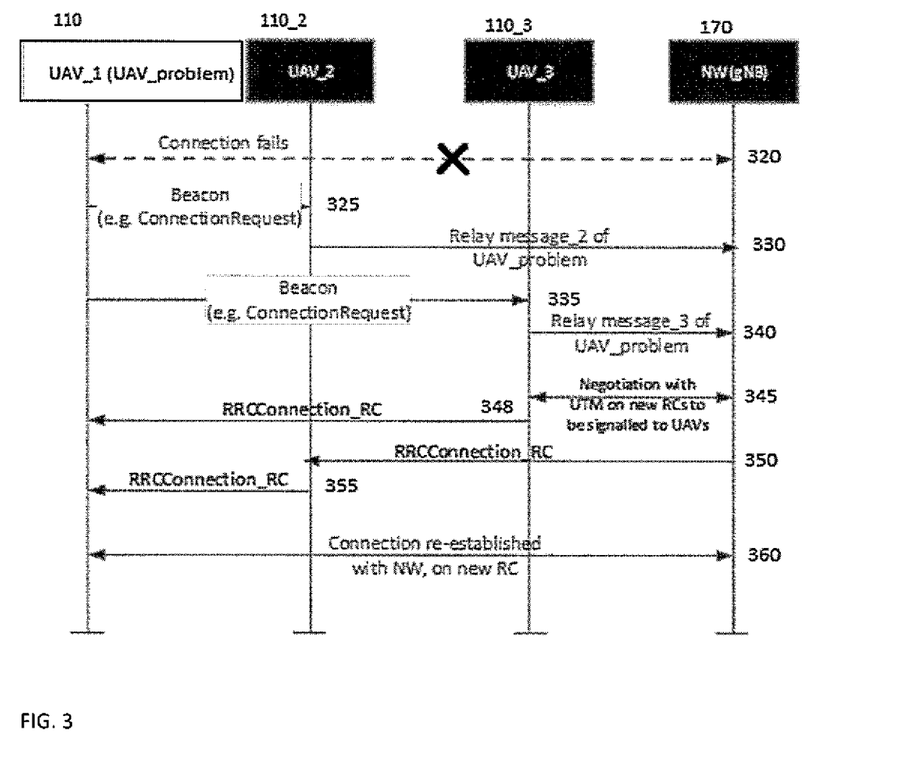
FIG. 3 shows a flow diagram showing other example operations in accordance with an example embodiment of the invention including information of relay operations for proactive signalling of rescue coordinates.

Another example in accordance with example embodiments of the invention can be seen in FIG. 3. In FIG. 3 a RAN is periodically providing RC ('rescue coordinates') to all UAVs served via broadcast/multicast or dedicated signalling is illustrated in FIG. 3.

As shown in FIG. 3 at step 320 an indication of a radio connection failure (or a radio connection degradation) is communicated to a NW (gNB) 170 (such as the gNB 170 as in FIG. 1) from a UAV_1 (marked as UAV_problem in our example) 110 (such as the UE 110 as in FIG. 1). Here, the connection of UAV_1 (UAV_problem) 110 fails and this is detected by the UE itself, which leads to it broadcasting a beacon (for example broadcasting a message Connection-Request) 325 and 335 to the UAV_2 110_2 and the UAV_3 1103, respectively, as shown in FIG. 3. The UAV_3 110_3 is At step 330 of FIG. 3 UAV_2 110_2 relays the message of UAV_1 (UAV_problem 110) (such as the UE 110_2 as in FIG. 1) for example as Relay message 2 of the UAV_problem to the NW (gNB) 170. Also as shown in step 340 of FIG. 3 there is relaying by UAV_3 110_3 of for example Relay message 3 of the UAV_problem to the NW (gNB) 170. At step 345 of FIG. 3 there is negotiating with air traffic management (UTM) on new radio connections (RCs) to be signaled to UAVs. In the given example, the negotiation with UTM will be done by the closest UAV that can relay the message to NW (gNB 170). In response to the negotiation there is at step 348 of FIG. 3 establishing a dedicated connection with the UAV_1 (UAV_problem in our example), for example an RRCConnection_RC between the UAV_3 110_3 and the UAV_(UAV_problem) 110. The NW (gNB) 170 then establishes an RRC connection for example RRCConnection_RC 350 with the UAV_2 110_2 to send a request for forwarding information to the UAV_1 (UAV_problem) 110. In accordance with an example embodiment of the invention the request is received by UEs UAV_2 and UAV_3, who both forward this to the network (gNB). During these operations the network chooses one of the UEs who have forwarded the request (or multiple UEs) and sends new coordinates for UAV_1 to this UE or these UEs, and in this example the UAV_2 110 is selected. The UAV_2 110_2 then sends the information from the NW (gNB) 170 to the UAV_1 (UAV_problem) 110 over for example RRCConnection_RC 355. The UAV_1 (UAV_problem) 110 then moves to the new coordinates and reconnect with the network. As shown in step 360 based on the information forwarded from the UAV_2 110_2 the UAV_1 (UAV_problem) 110 re-establishes a connection with the NW (gNB) 170 at the new coordinates. It is also noted that in accordance with example embodiments of the invention the new coordinates can be informed to the UTM as well.

An alternative in accordance with example embodiments of the invention include that a UAV (such as the UAV_1 (UAV_problem) 110 as in FIG. 3 and/or the UE 110 as in FIG. 1) returns to an old position (where last it had connection) without signalling. Further, when the UAV returns to an old location where it has re-established radio connection with the cellular network (for example terrestrial or satellite) it can signal lost radio connection on its original route and the network can provide an updated, more reliable (for connectivity) route from the current location.

In still another alternative implementation in accordance with example embodiments of the invention, which avoid the problems in the first place there is:
- Providing the UAV regularly a direction for better radio connectivity, which it can use by the UAV autonomously in case it loses its connection. So, the network regularly gives a rescue path in case of an RLF;
- The network basing the rescue path on collection of data from other UEs/UAV combined with network planning data;
- Signalling of information providing the rescue path may be signaled from the network to some or all UEs in an area/cell such as for example through a multicast message. Further, in accordance with example embodiments, the signaling can be for certain moves upwards or for a certain route/location or it may be given to every single UE separately through an RRC message; and/or
- Alternatively, cell may start to send "recovery direction" or a "rescue coordinate" indication message in case the network detects that UAV may lose radio connection. And in case of lost radio connection UAV will fly to in the "recovery direction" or to the "rescue coordinate":
  - Network may estimate the probability of UAV lost radio connection on at least one of e.g. based on signal level and quality measurements, UAV speed, height and direction Another option in accordance with example embodiments of the invention may be to always or regularly preconfigure a relay link for providing faster connection setup of relay link after connection failure. This ensures a secure relay link is set up by the network and prevents unauthorized relay nodes from attempting to assist in the recovery of the UAV in the event of a connection failure. At the same time, the link connection recovery is improved since it will be done more controlled manner (from scheduling and network load point of view) than for example with blind relay node recovery.

Figure 4:
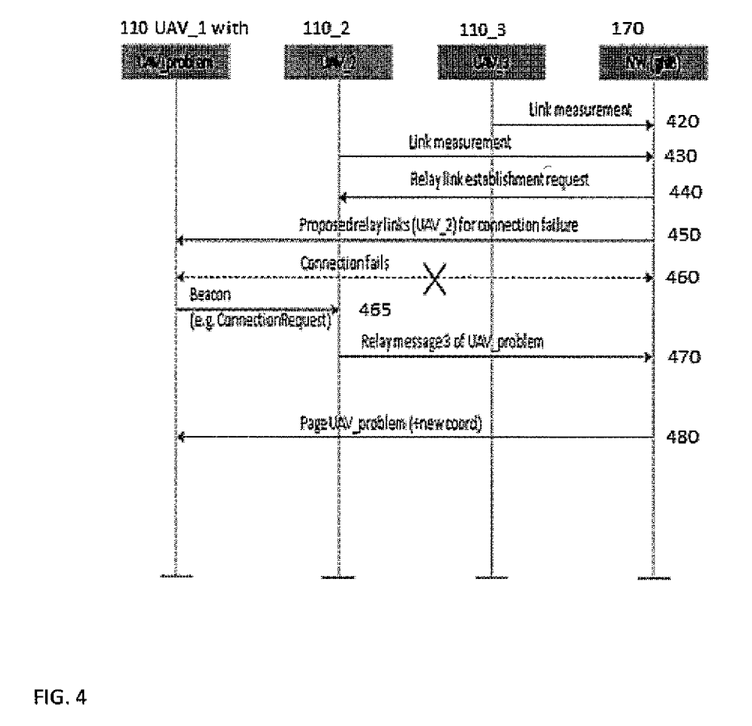
FIG. 4 shows a flow diagram showing other example operations in accordance with an example embodiment of the invention including information of paging operations for proactive signalling of rescue coordinates.

FIG. 4 illustrates another flow diagram including operations in accordance with example embodiments of the invention. As shown in FIG. 4 the NW (gNB) 170 (such as the gNB 170 as in FIG. 1) is receiving link measurements 420 and 430 from UAV_3 110_3 and UAV_2 110_2 (such as the UE 110_2 and the UE 110 as in FIG. 1), respectively. Then based on at least these link measurements the NW (gNB) 170 selects the UAV_2 110_2 as a relay node for communicating recovery information between the UAV_1 110 and the NW (gNB) 170 (e.g., rescue path) in case of a UAV problem. As shown in step 450 of FIG. 4 an indication of the selection is provided by the NW (gNB) 170 to the UAV_1 110. Then as shown in step 460 of FIG. 4 after the connection at the UAV_1 fails, the UAV_1 will send a message such as for example including a beacon or broadcast request to the UAV_2, as was selected by the NW (gNB) 170. The UAV_2 110_2 then relays the message from the UAV_1 110 to the NW (gNB) 170 as shown in step 470 of FIG. 4. As shown in step 480 of FIG. 4 the NW (gNB) 170 then attempts to send a direct page to the UAV_1 (UAV_problem) 110, the paging including a rescue path and/or new coordinates for the UAV_1 to follow to address the connection failure. The difference to FIG. 1 is that NW (170) may page directly UAV_1 and may try to establish connection (for example Paging message contains the new coordinates for the UAV_1).

Further, in accordance with example embodiments of the invention:

When connection to cellular network is not available, UAV will send (or broadcast) a ConnectionRequest to a neighboring UAV(s) using cellular D2D sidelink radio resource allocation and/or other radio technologies, such Blutetooth, Zigbee, or proprietary technology:
- Based on the previous successfully received System Information indicating the locally available resources for broadcast,
- Based on System Information broadcasted by neighboring UAV, which is connected to network or ground station.
- Based on the programmed configuration, and/or
- Based on previous, periodically transmitted information from the ground station indicating the presence of neighboring UAVs (e.g., based on location) and their related information.

Figure 5A:
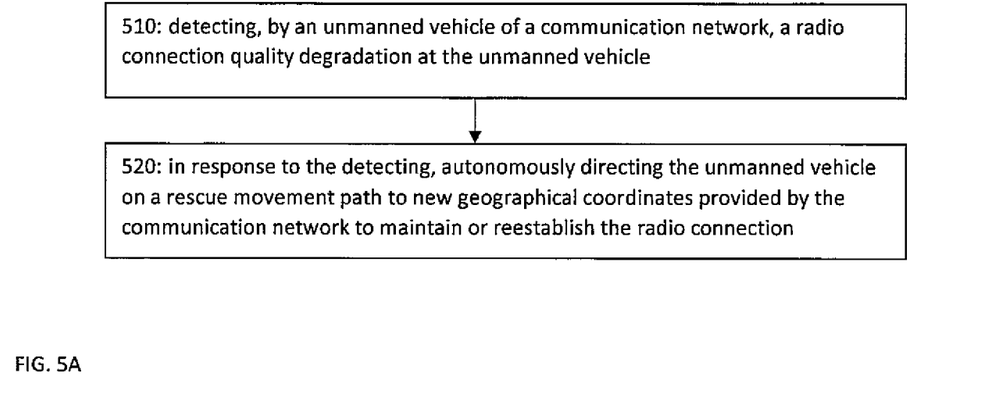
FIG. 5A and FIG. 5B each show a method in accordance with example embodiments of the invention which may be performed by an apparatus.

In other example embodiments of the invention there is:

Alternatively, in case there are other UAV around (in some vicinity) as a fallback emergency mechanism or even to avoid collision:
1. UAV could send to others a warning beacon signal:
   In this case, other UAV could avoid collisions and signal to NW the info on the 'lost' UAV, and
   NW could instruct the relaying UAV, what message/action could transmit to the 'lost' UAV, and
   When more than one UAV relays the 'lost' message to the NW, the network may select one relaying UAV for further assistance, e.g., based on the link quality of the relay path,
   Alternatively, the other UAV receives the warning beacon signal and directly responds to indicate its own presence and availability for relaying depending on, e.g., the strength of the beacon signal,
   When multiple UAVs respond to the warning beacon signal, the 'lost' UAV may select one of them based on the response message, and/or
   The 'lost' UAV establishes connectivity with the relaying UAV.
2. In parallel/or alternatively, if after a preconfigured Time T the NW has not obtained any information from UAV ID, NW could inform other UAVs in the vicinity that one of them has gone off the map:
   NW could instruct other UAVs (if they go towards UAV with problem) or reroute them:
     For example, 1) RAN indicates failure to UTM, 2) UTM takes actions; 3) UTM indicates it back to RAN in a message format understood by RAN;
Until time T, if UAV is without NW connection, it could still continue for a while according to its flight-plan, but after that UAV needs to stop until contact with another UAV/NW is made; and
Serving cell informs UAV about possible incidents at flight route with specific message (if serving cell is not available then D2D link could be used instead for possible incident information transmission):
  link failure possibility
    coverage problem and length in time
    cell load problem—possible carrier switching
    restricted zone warning
    best HO cells (these UAV will measure also itself by default later)
    scheduling information preparation at HO cell(s) e.g. for semi persistence scheduling allowing URLLC type of service support
  If possible check UAV control for flight route take control information into account for link failure protection mechanisms
provide network service for possible UAV request for surrounding network
additional radio resources
traffic change impact FIG. 5A illustrates operations which may be performed by a user equipment device such as, but not limited to, a UE 110 or a UE 110_2 as in FIG. 1 or an unmanned vehicle. As shown in step 510 there is detecting, by an unmanned vehicle of a communication network, a radio connection quality degradation at the unmanned vehicle. Then as shown in step 520 of FIG. 5A there is, in response to the detecting, autonomously directing the unmanned vehicle on a rescue movement path to new geographical coordinates provided by the communication network to maintain or reestablish the radio connection.

In accordance with the example embodiments as described in the paragraph above, there is broadcasting a connection request beacon towards at least one other unmanned vehicle in a radio coverage area of the unmanned vehicle for forwarding by the at least one other unmanned vehicle towards the communication network; and based on the broadcasting, receiving via the at least one other unmanned vehicle the rescue movement path to new geographical coordinates as provided by the communication network to maintain or reestablish the radio connection.

In accordance with the example embodiments as described in the paragraphs above, wherein the connection request beacon is broadcast towards the at least one other unmanned vehicle using at least one of a cellular device-to-device side-link radio resource allocation, and other radio technologies, wherein the other radio technologies comprise at least one of Bluetooth, Zigbee, and proprietary radio technologies.

In accordance with the example embodiments as described in the paragraphs above, wherein the rescue movement path is provided to the unmanned vehicle via the at least one other unmanned vehicle using one of a multicast message, or a radio resource connection message provided by the communication network to each of the at least one other unmanned vehicle.

In accordance with the example embodiments as described in the paragraphs above, wherein the rescue movement path to new geographical coordinates is received from the communication network via a particular other unmanned vehicle selected by the communication network from the at least one other unmanned vehicle.

In accordance with the example embodiments as described in the paragraphs above, wherein the particular unmanned vehicle is part of a radio relay link preconfigured by the communication network for providing connection setup information to an unmanned vehicle of the communication network.

In accordance with the example embodiments as described in the paragraphs above, wherein the rescue movement path is based on data from the at least one other unmanned vehicle of the communication network combined with network planning data.

In accordance with the example embodiments as described in the paragraphs above, wherein the rescue movement path to new geographical coordinates was provided by the communication network to the unmanned vehicle for radio connection quality degradation prior to the radio connection quality degradation.

In accordance with the example embodiments as described in the paragraphs above, wherein the rescue movement path to new geographical coordinates is provided by the communication network prior to the radio link failure based on at least one of a signal level, quality measurements, a speed, an altitude, and a movement direction of the unmanned vehicle as determined by the communication network.

In accordance with the example embodiments as described in the paragraphs above, there is; in response to the detecting, sending a warning signal towards the at least one other unmanned vehicle; and in response to the warning signal, establishing a connection with a selected one of the at least one other unmanned vehicle that responded to the warning signal for communication with the communication network.

In accordance with the example embodiments as described in the paragraphs above, there is, in response to the detecting, starting a timer at the unmanned vehicle; and based on the radio connection quality degradation remaining at an expiration of the timer, execute a fallback operation at the unmanned vehicle until contact with another unmanned vehicle is achieved.

In accordance with an example embodiment of the invention as described above there is an apparatus comprising: means for detecting (e.g., one or more antennas 128 and one or more transceivers 130, processor(s) 120, Memory(ies) 125, computer program code 123 as in FIG. 1) by an unmanned vehicle (UE 110 and/or UE 110_2 as in FIG. 1) of a communication network (e.g., gNB 170 and/or Network 100 as in FIG. 1). Then there is, means, in response to the detecting, for autonomously directing (e.g., one or more antennas 128 and one or more transceivers 130, processor(s) 120, Memory(ies) 125, computer program code 123 as in FIG. 1) the unmanned vehicle (UE 110 and/or UE 110_2 as in FIG. 1) on a rescue movement path to new geographical coordinates provided by the communication network (e.g., gNB 170 and/or Network 100 as in FIG. 1) to maintain or reestablish the radio connection.

In the example aspect of the invention according to the paragraph above, wherein at least the means for detecting and directing comprises a non-transitory computer readable medium [Memory(ies) 125 as in FIG. 1] encoded with a computer program [computer program code 123 as in FIG. 1] executable by at least one processor [Processor(s) 120 as in FIG. 1].

Figure 5B:
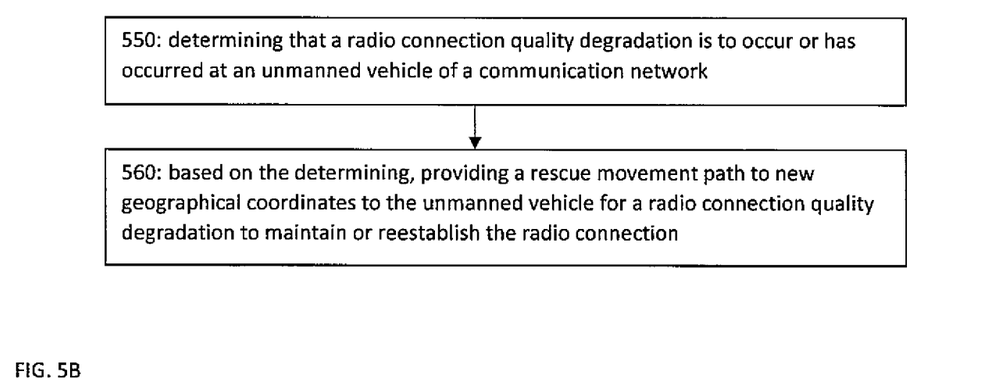

FIG. 5B illustrates operations which may be performed by a base station device such as, but not limited to, a gNB 170 as in FIG. 1. As shown in step 550 there is determining that a radio connection quality degradation is to occur or has occurred at an unmanned vehicle of a communication network. As shown in step 560 of FIG. 5B there is, based on the determining, providing a rescue movement path to new geographical coordinates to the unmanned vehicle for a radio connection quality degradation to maintain or reestablish the radio connection.

In accordance with the example embodiments as described in the paragraph above, wherein the determining comprises determining that a radio connection quality degradation has occurred at the unmanned vehicle based on receiving a connection request beacon forwarded by the at least one other unmanned vehicle from the unmanned vehicle towards the communication network.

In accordance with the example embodiments as described in the paragraphs above, wherein the recue movement path to new geographical coordinates is provided to the unmanned vehicle via at least one other unmanned vehicle in a radio coverage area of the unmanned vehicle using one of a multicast message, or a radio resource connection message provided by the communication network to each of the at least one unmanned vehicle.

In accordance with the example embodiments as described in the paragraphs above, wherein the rescue movement path to new geographical coordinates is provided by the communication network to the unmanned vehicle via a particular other unmanned vehicle selected by the communication network from the at least one other unmanned vehicle.

In accordance with the example embodiments as described in the paragraphs above, wherein the particular unmanned vehicle is part of a radio relay link preconfigured by the communication network for providing connection setup information to the unmanned vehicle.

In accordance with the example embodiments as described in the paragraphs above, wherein the rescue movement path is based on data from the at least one unmanned vehicle of the communication network combined with network planning data.

In accordance with the example embodiments as described in the paragraphs above, wherein the rescue movement path to new geographical coordinates was provided by the communication network to the unmanned vehicle for radio connection quality degradation prior to the radio connection quality degradation.

In accordance with the example embodiments as described in the paragraphs above, wherein the rescue movement path to new geographical coordinates is provided by the communication network prior to the radio link failure based on at least one of a signal level, quality measurements, a speed, an altitude, and a direction of the unmanned vehicle as determined by the communication network.

In accordance with the example embodiments as described in the paragraphs above, wherein the rescue movement path to new geographical coordinates is provided by the communication network via a direct page to the unmanned vehicle.

In accordance with the example embodiments as described in the paragraphs above, there is, in response to detecting the radio connection quality degradation, starting a timer; and based on the radio connection quality degradation remaining at an expiration of the timer, sending towards at least one unmanned vehicle of the communication network information comprising an indication of the radio connection quality degradation at the unmanned vehicle.

In accordance with the example embodiments as described in the paragraphs above, wherein the information comprises rerouting information for the at least one unmanned vehicle.

In accordance with an example embodiment of the invention as described above there is an apparatus comprising: means for determining (e.g., one or more memories 155 include computer program code 153 and one or more processors 152 as in FIG. 1) that a radio connection quality degradation is to occur or has occurred at an unmanned vehicle (e.g., UE 110 and/or UE 110_2 as in FIG. 1) of a communication network (Network 100 as in FIG. 1). There is means, based on the determining, for providing (e.g., RRH 203, one or more transceivers 160, one or more memories 155 include computer program code 153 and one or more processors 152 as in FIG. 1) a rescue movement path to new geographical coordinates to the unmanned vehicle (e.g., UE 110 and/or UE 110_2 as in FIG. 1) for a radio connection quality degradation to maintain or reestablish the radio connection.

In the example aspect of the invention according to the paragraph above, wherein at least the means for determining and providing comprises a non-transitory computer readable medium [one or more memories 155 as in FIG. 1] encoded with a computer program [computer program code 153 as in FIG. 1] executable by at least one processor [one or more processors 152 as in FIG. 1].

As another example, link failure may mean for example radio link degradation such that communication is degraded or even interrupted. For example, measured signal with serving cell (NW) RSRP is below a threshold. In another example, radio link monitoring records a problem and the connection fails or interrupts (for example UAV cannot communicate with NW).

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" is may be used herein is intended to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. A method, comprising:
   detecting, by an unmanned vehicle of a communication network, a radio connection quality degradation of a radio connection at the unmanned vehicle;
   based at least on the detecting, broadcasting a connection request beacon towards at least one other unmanned vehicle in a radio coverage area of the unmanned vehicle for forwarding by the at least one other unmanned vehicle towards the communication network; and
   based on the broadcasting, receiving via the at least one other unmanned vehicle a movement path to new geographical coordinates as provided by the communication network to recover, maintain, or reestablish the radio connection in response to the radio connection quality degradation detected at the unmanned vehicle.

2. The method according to claim 1, wherein the connection request beacon is broadcast towards the at least one other unmanned vehicle using at least one of a cellular device-to-device side-link radio resource allocation, and other radio technologies, wherein the other radio technologies comprise at least one of Bluetooth, Zigbee, and proprietary radio technologies.

3. The method according to claim 1, wherein the movement path is provided to the unmanned vehicle via the at least one other unmanned vehicle using one of a multicast message, or a radio resource connection message provided by the communication network to each of the at least one other unmanned vehicle.

4. The method according to claim 1, wherein the movement path to new geographical coordinates is received from the communication network via a particular other unmanned vehicle selected by the communication network from the at least one other unmanned vehicle.

5. The method according to claim 4, wherein the particular other unmanned vehicle is part of a radio relay link preconfigured by the communication network for providing connection setup information to an unmanned vehicle of the communication network to recover, maintain, or reestablish the radio connection in response to the radio connection quality degradation detected by the unmanned vehicle.

6. The method according to claim 1, wherein the movement path is based on data from the at least one other unmanned vehicle of the communication network combined with network planning data.

7. The method according to claim 1, wherein the movement path to new geographical coordinates was provided by the communication network to the unmanned vehicle for radio connection quality degradation prior to the radio connection quality degradation.

8. The method according to claim 7, wherein the movement path to new geographical coordinates is provided by the communication network prior to the radio link failure based on at least one of a signal level, quality measurements, a speed, an altitude, and a movement direction of the unmanned vehicle as determined by the communication network.

9. The method according to claim 1, comprising:
   in response to the detecting, sending a warning signal towards at least one other unmanned vehicle; and
   in response to the warning signal, establishing a connection with a selected one of the at least one other unmanned vehicle that responded to the warning signal for communication with the communication network.

10. The method according to claim 1, comprising:
    in response to the detecting, starting a timer at the unmanned vehicle; and
    based on the radio connection quality degradation remaining at an expiration of the timer, execute a fallback operation at the unmanned vehicle until contact with another unmanned vehicle is achieved.

11. A non-transitory computer-readable medium storing program code, the program code executed by at least one processor to perform the method of claim 1.

12. An apparatus, comprising:
    at least one processor; and
    at least one memory including computer program code, where the at least one memory and the computer program code are configured, with the at least one processor, to cause the apparatus to at least:
    detect, by an unmanned vehicle in a communication network, a radio connection quality degradation of a radio connection at the unmanned vehicle;
    based at least on the detecting, broadcast a connection request beacon towards at least one other unmanned vehicle in a radio coverage area of the unmanned vehicle for forwarding by the at least one other unmanned vehicle towards the communication network; and
    based on the broadcasting, receive via the at least one other unmanned vehicle a movement path to new geographical coordinates as provided by the communication network to recover, maintain, or reestablish the radio connection in response to the radio connection quality degradation detected at the unmanned vehicle.

13. A method, comprising:
    determining that a radio connection quality degradation of a radio connection is to occur or has occurred at an unmanned vehicle of a communication network;
    receiving from the unmanned vehicle via at least one other unmanned vehicle a broadcast connection request beacon; and
    based on the receiving, identifying to the unmanned vehicle via the at least one other unmanned vehicle a movement path to new geographical coordinates to recover, maintain, or reestablish the radio connection.

14. The method according to claim 13, wherein the determining comprises determining that a radio connection quality degradation has occurred at the unmanned vehicle based on receiving a connection request beacon forwarded by at least one other unmanned vehicle from the unmanned vehicle towards the communication network.

15. The method according to claim 13, wherein the recue movement path to new geographical coordinates is provided to the unmanned vehicle via at least one other unmanned vehicle in a radio coverage area of the unmanned vehicle using one of a multicast message, or a radio resource connection message provided by the communication network to each of the at least one other unmanned vehicle.

16. The method according to claim 13, wherein the movement path to new geographical coordinates is provided by the communication network to the unmanned vehicle via a particular unmanned vehicle selected by the communication network from the at least one other unmanned vehicle.

17. The method according to claim 13, wherein the movement path is based on data from the at least one other unmanned vehicle of the communication network combined with network planning data.

18. The method according to claim 13, wherein the movement path to new geographical coordinates was provided by the communication network to the unmanned vehicle for radio connection quality degradation prior to the radio connection quality degradation.

19. The method according to claim 18, wherein the movement path to new geographical coordinates is provided by the communication network prior to the radio link failure based on at least one of a signal level, quality measurements, a speed, an altitude, and a direction of the unmanned vehicle as determined by the communication network.

20. The method according to claim 13, comprising:
in response to detecting the radio connection quality degradation, starting a timer; and
based on the radio connection quality degradation remaining at an expiration of the timer, sending towards at least one other unmanned vehicle of the communication network information comprising an indication of the radio connection quality degradation at the unmanned vehicle.

21. A non-transitory computer-readable medium storing program code, the program code executed by at least one processor to perform the method of claim 13.

* * * * *